United States Patent
Leblond et al.

(10) Patent No.: US 6,926,054 B2
(45) Date of Patent: Aug. 9, 2005

(54) ANCHORING OF A TIRE CARCASS

(75) Inventors: Philippe Leblond, Gerzat (FR); Laure Huault, Clermont-Ferrand (FR); Yves Herbelleau, Carqueiranne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 244 days.

(21) Appl. No.: 10/200,108

(22) Filed: Jul. 19, 2002

(65) Prior Publication Data

US 2003/0062107 A1 Apr. 3, 2003

Related U.S. Application Data

(60) Provisional application No. 60/360,091, filed on Feb. 26, 2002.

(30) Foreign Application Priority Data

Jul. 20, 2001 (FR) .............................. 01 09962

(51) Int. Cl.⁷ .................... B60C 15/00; B60C 15/06; B60C 9/00
(52) U.S. Cl. ................ 152/539; 152/540; 152/547; 152/548; 152/550
(58) Field of Search ................ 152/539, 540, 152/550, 547, 548

(56) References Cited

U.S. PATENT DOCUMENTS

| 4,795,523 A | 1/1989 | Laurent et al. ............ 156/397 |
| 4,801,344 A | 1/1989 | Laurent et al. ............ 156/117 |
| 4,895,692 A | 1/1990 | Laurent et al. ............ 264/326 |
| 4,963,207 A | 10/1990 | Laurent ................... 156/117 |
| 5,171,394 A | 12/1992 | Laurent ................... 156/397 |
| 5,185,051 A | 2/1993 | Laurent et al. ............ 156/397 |
| 5,221,406 A | 6/1993 | Laurent ................... 156/397 |
| 5,660,656 A | 8/1997 | Herbelleauu et al. ....... 152/547 |
| 6,109,321 A | 8/2000 | Costa Pereira et al. ..... 152/547 |
| 6,425,429 B1 * | 7/2002 | Arnaud et al. ............ 152/547 |
| 6,626,221 B1 * | 9/2003 | Costa Pereira et al. ..... 152/547 |

* cited by examiner

Primary Examiner—Jeff H. Aftergut
Assistant Examiner—Justin Fischer
(74) Attorney, Agent, or Firm—Burns, Doane, Swecker & Mathis, LLP

(57) ABSTRACT

Tire containing a crown, two sidewalls and two beads, a carcass reinforcement with first reinforcing cords placed adjacent, aligned circumferentially in at least one circumferential alignment from at least one of said beads to one of said sidewalls and anchored in said one bead, and a crown reinforcement, said one bead containing an anchoring zone enabling the carcass reinforcement to be maintained and including at least one circumferentially oriented second reinforcing cord cooperating with an adjacent portion of the carcass reinforcement by means of a rubber anchoring compound in contact with the second reinforcing cord and the adjacent sections of the first reinforcing cords, wherein the rubber anchoring compound has a modulus of elasticity at a 10% deformation ranging between 10 and 20 MPa and wherein the rubber anchoring compound comprises at least one synthetic elastomer in the SBR group and of polybutadienes with a total proportion of synthetic elastomer exceeding 50% of the total weight of elastomers.

8 Claims, 3 Drawing Sheets

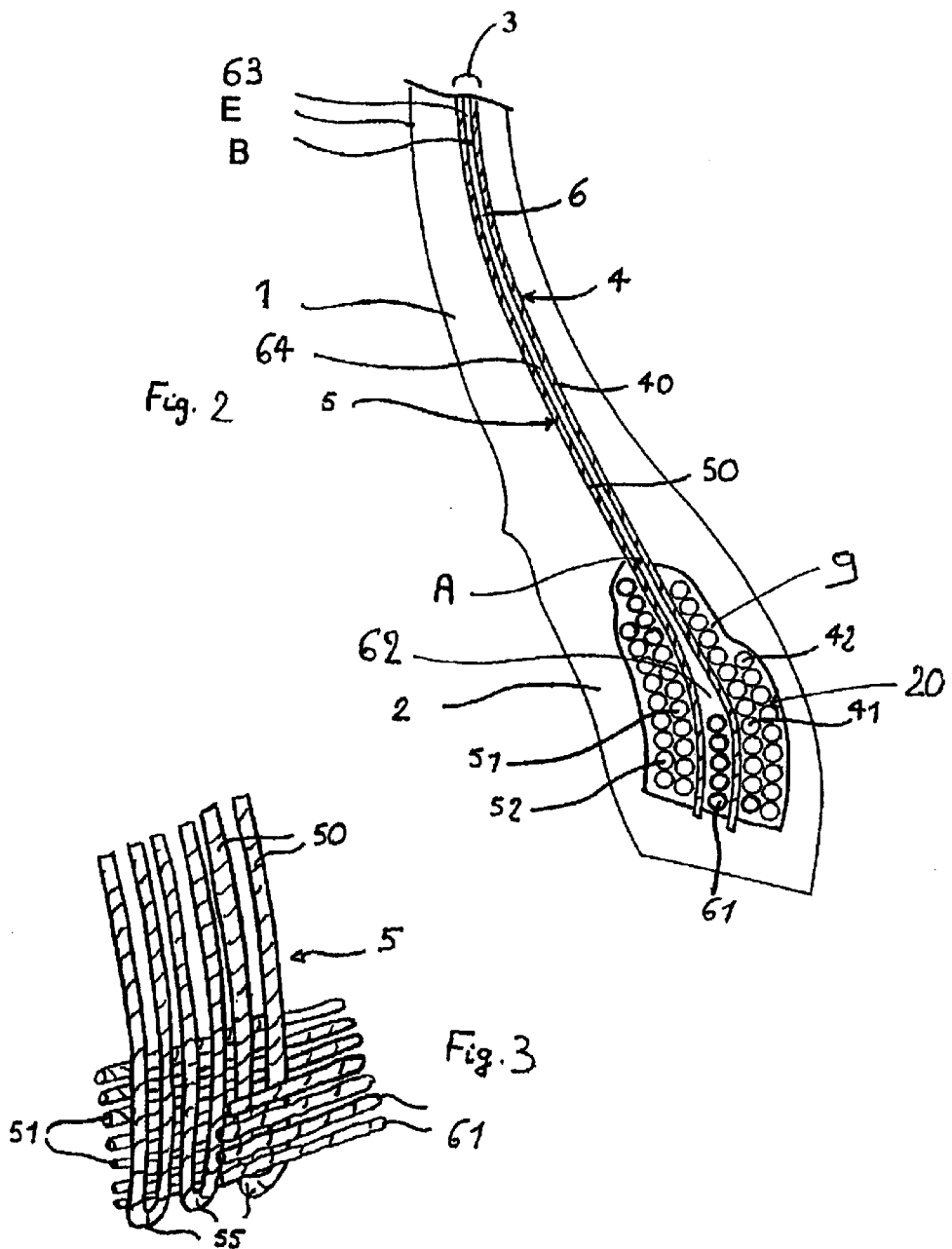

ANCHORING OF A TIRE CARCASS

CROSS REFERENCE TO RELATED APPLICATION

This application claims priority from U.S. provisional application Ser. No. 60/360,091, filed Feb. 26, 2002.

BACKGROUND

1. Field of the Invention

The present invention concerns tires and, in particular, the arrangement of the carcass cord and their anchoring in the beads.

2. The Related Art

WO 98/54006 recently proposed a new type of carcass reinforcement of a tire and its anchoring in its bead. A tire, according to this application, contains a crown, two sidewalls and two beads, a carcass reinforcement with first reinforcing cords placed adjacent, aligned circumferentially in at least one circumferential alignment from a bead to a sidewall and anchored in said bead, and a crown reinforcement, each of the beads containing an anchoring zone enabling the carcass reinforcement to be maintained and including at least one circumferentially oriented second reinforcing cord cooperating with an adjacent portion of the carcass reinforcement by means of a rubber anchoring compound. This rubber anchoring compound has a modulus of elasticity at a 10% deformation greater than 20 MPa and preferably greater than 30 MPa.

This new architecture of the tire beads gives excellent results, notably, as far as fatigue is concerned. The applicants found, however, that the marked rigidity of those beads could entail difficulties with mounting and demounting the tires, notably, on manual mountings and demountings, for large-sized tires, such as truck tires.

The present invention is intended to solve that problem.

In the text that follows:

"cord" means monofilaments as well as multifilaments, or assemblages like cords, yarns or else any type of equivalent assemblage, regardless of the material and treatment of these cords, such as surface treatment or coating or presizing in order to promote adhesion to the rubber;

"contact" between a cord and a rubber anchoring compound means the fact that at least a part of the outer circumference of the cord is in close contact with the rubber anchoring compound; if the cord contains a covering or a coating, the term contact means that it is the outer circumference of that covering or coating which is in close contact with the rubber anchoring compound;

"axial" means a direction parallel to the axis of rotation of the tire; that direction can be "axially inner" when it is directed toward the inside of the tire and "axially outer" when it is directed toward the outside of the tire;

"radial" means a direction passing through the axis of rotation of the tire and normal to the latter; that direction can be "radially inner" or "radially outer" depending on whether it is directed toward the axis of rotation of the tire or toward the outside of the tire;

"modulus of elasticity" of a rubber compound means a secant modulus of extension at 10% deformation and at room temperature; the measurement is made after a first cycle of accommodation to 10% deformation;

$$E_{10} = \frac{F_{10}}{S \times \varepsilon_{10}} \quad \text{i.e.} \quad E_{10} = \frac{F_{10}(1+\varepsilon_{10})}{S_0 \times \varepsilon_{10}} \quad \text{and} \quad E_{10} = \frac{F_{10} \times 1.1}{S_0 \times 0.1}$$

where $\varepsilon_{10}$ is equal to 0.1 with $E_{10}$: secant modulus of extension at 10% extension; $F_{10}$: extension force at 10% extension; $S_o$: initial section of the test sample or piece; S: section of test sample at extension $\varepsilon$, for rubber material, $$S = \frac{S_0}{1+\varepsilon};$$

and $\varepsilon_{10}$: extension at 10%.

"Tg" of an elastomer means the vitreous transition temperature of the latter measured by differential thermal analysis;

"static creep test" means a test in which test pieces are prepared, the useful part of which has a length of 70 mm, a width of 5 mm and a thickness of 2.5 mm (those test pieces are cut into vulcanized plates 2.5 mm thick); the test pieces are placed in an oven at 150° C. and a weight of 3 kg is immediately coupled to them; the test is thus carried out with an initial strain of:

$$\sigma_0 = \frac{M \times g}{S_0} = 2.35 Mpa$$

with M: weight applied; g: acceleration due to gravity; and $S_0$: initial section of the measuring test piece; the elongation of the useful part of the test piece is measured as a function of time; the "static creep rate" corresponds to the variation of deformation in a given time, for example, between 3 and 5 test hours:

$$\tau = \frac{\Delta \varepsilon}{\Delta t}$$

with: $\Delta\varepsilon = \varepsilon(t_2) - \varepsilon(t_1)$ variation of deformation measured during $\Delta t = t_2 - t_1$ in minutes (min);

"rheometry test": an alternate shear test at a deformation of ±0.2 degree, a frequency of 100 cycles/min, a temperature of 197° C. and a duration of 10 min; Monsanto rheometer; the test is carried out on a raw compound disk; the development of the torque resulting from the shear imposed between the two faces of the disk is registered for 10 min.; the development of the torque is particularly noted here after the maximum measured; if the torque measured remains stable, there is no reversion, that is, diminution of stiffness of the test piece; if the torque measured diminished, it is indicated that there is a reversion; the reversion phenomenon expresses a diminution of rigidity of the test piece under the test conditions; this is a test of thermal stability of the compound at high temperature; one observes:

$$r = \frac{C_{\max} - C_{10}}{C_{\max}} * 100$$

r is the reversion rate following the test; $C_{max}$ is the maximum torque measured and $C_{10}$ is the torque measured after 10 min. of test;

"a circumferentially oriented cord" means a cord oriented roughly parallel to the circumferential direction of the tire, that is, forming an angle with that direction not departing by more than five degrees from the circumferential direction; and a "radially oriented cord" means a cord roughly contained in the same axial plane or in a plane forming an angle less than or equal to 10 degrees with an axial plane.

SUMMARY

A tire according to the invention contains a crown, two sidewalls and two beads, a carcass reinforcement with first cords placed adjacent, aligned circumferentially in at least one circumferential alignment from at least one of said beads to one of said sidewalls and anchored in said one bead, and a crown reinforcement, said bead containing an anchoring zone enabling the carcass reinforcement to be maintained and including at least one circumferentially oriented second cord cooperating with an adjacent portion of the carcass reinforcement by means of a rubber anchoring compound in contact with the second cord and the adjacent sections of the first cords. The rubber anchoring compound of such tire has a modulus of elasticity at a 10% deformation ranging between 10 and 20 MPa and comprises at least one synthetic elastomer in the SBR group and polybutadienes with a total proportion of synthetic elastomer exceeding 50% of the total weight of elastomers.

The applicants discovered very surprisingly that this rubber anchoring compound made it possible, in spite of its rigidity far below what was previously recommended, to preserve very satisfactory fatigue characteristics of the beads concerned.

The total proportion of synthetic elastomer ranges preferably between 55 and 65% of the total weight of elastomers.

Above 65%, the raw adhesive capacity of the bonding rubber becomes insufficient and that raises problems of fabrication of the tire beads; on the other hand, below 55%, the resistance of the rubber anchoring compounds to a static creep stress at high temperature is degraded.

The rubber anchoring compound preferably contains an SBR of Tg ranging between −70 and −25° C. with a proportion by weight exceeding 20% of the total weight of elastomers.

It can also contain a polybutadiene of Tg ranging between −110 and −90° C. with a proportion by weight of less than 40% of the total weight of elastomers.

In fact, the presence of polybutadiene improves the thermal stability of the rubber anchoring compound at high temperature; however, beyond 40% of the total weight of elastomers the rubber anchoring compound becomes difficult to attain.

The invention also concerns a tire containing a crown, two sidewalls and two beads, a carcass reinforcement with first cords placed adjacent, aligned circumferentially in at least one circumferential alignment from at least one of said beads to one of said sidewalls and anchored in said one bead, and a crown reinforcement, said one bead containing an anchoring zone enabling the carcass reinforcement to be maintained and including at least one circumferentially oriented second cord cooperating with an adjacent portion of the carcass reinforcement by means of a rubber anchoring compound in contact with the second cord and the adjacent sections of the first cords, wherein the rubber anchoring compound has a modulus of elasticity at a 10% deformation ranging between 10 and 20 MPa and wherein the rubber anchoring compound supports, without breaking, a static creep stress at 150° C. under a strain of 2.35 MPa for at least 5 hours.

The rubber anchoring compound preferably has a static creep rate at 150° C. under a strain of 2.35 MPa less than $2.10^{-3}$ /min between 3 and 5 hours of stress.

The invention also concerns a tire containing a crown, two sidewalls and two beads, a carcass reinforcement with first cords placed adjacent, aligned circumferentially in at least one circumferential alignment from at least one of said beads to one of said sidewalls and anchored in said one bead, and a crown reinforcement, said one bead containing an anchoring zone enabling the carcass reinforcement to be maintained and including at least one circumferentially oriented second cord cooperating with an adjacent portion of the carcass reinforcement by means of a rubber anchoring compound in contact with the second cord and the adjacent sections of the first cords, wherein said rubber anchoring compound has a modulus of elasticity at a 10% deformation ranging between 10 and 20 MPa and wherein said rubber anchoring compound has a reversion rate after 10 min at 197° C. less than 10% and preferably less than 5%.

The tires according to the invention are preferably such that the first cords form adjacent forward and return paths with loops in said one bead connecting a forward to a return path every time.

BRIEF DESCRIPTION OF THE DRAWINGS

The invention is now described by means of the following drawings:

FIG. 2 is a partial cross section essentially showing a sidewall and a bead of a second tire according to the invention;

FIG. 3 is a view in perspective, schematically showing the arrangement of a part of the cords.

DETAILED DESCRIPTION

Figure 1:
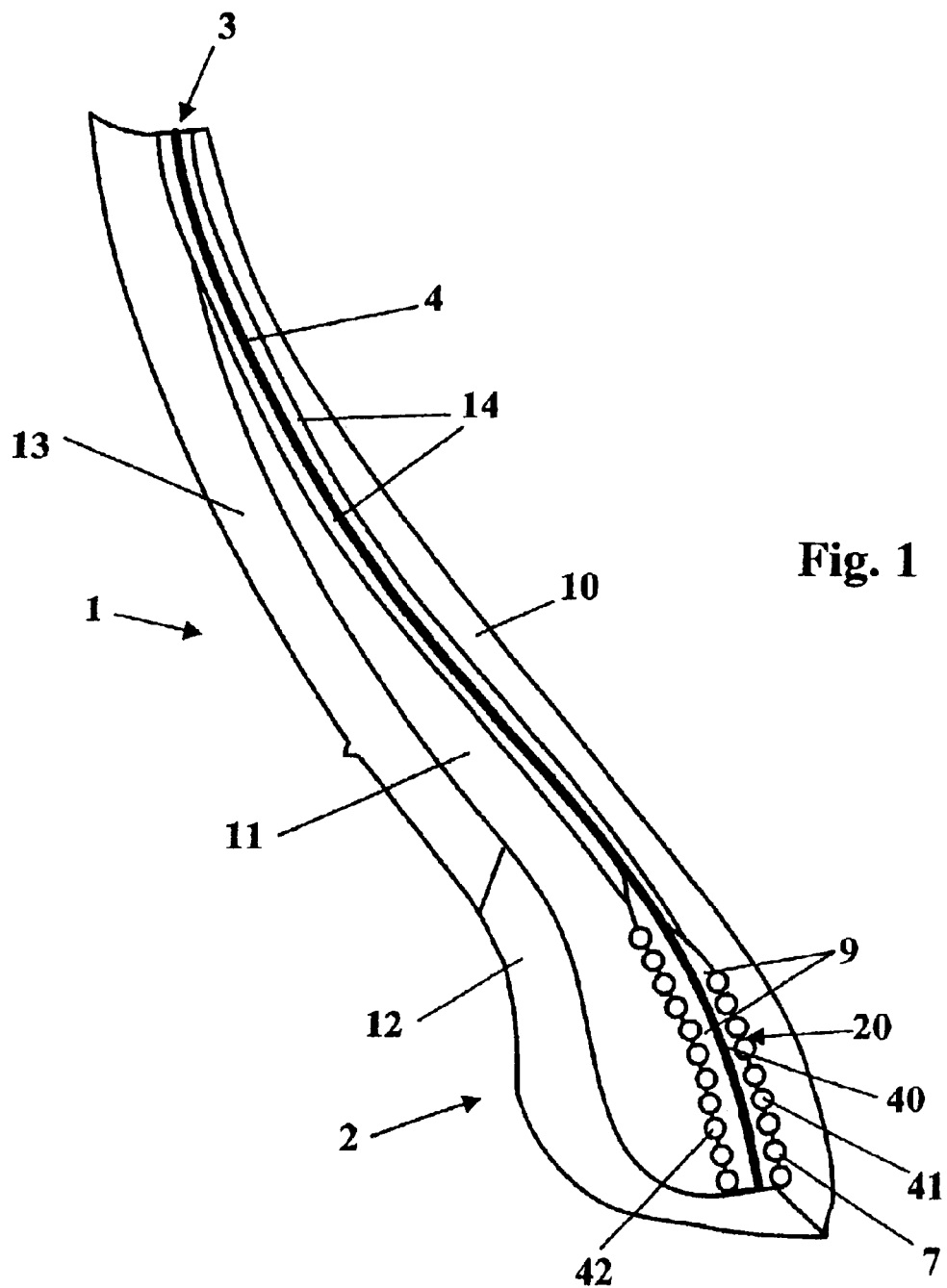
FIG. 1 is a partial cross section essentially showing a sidewall and a bead of a tire according to the invention.

In FIG. 1, a bead and a sidewall of a tire according to the invention are presented in partial cross section. That tire contains a sidewall 1 adjacent to a bead 2. A carcass reinforcement 3 extends circumferentially from the bead 2 to the sidewall 1 and entails, in the example presented, a circumferential alignment of first cords 4. The first cords 4 are radially oriented in the beads and the sidewalls and are anchored in an anchoring zone 20 of the bead 2. The anchoring zone 20 comprises two main elements, two circumferential windings 41 and 42 of second cords 7 arranged on both sides of the sections 40 of the adjacent first cords 4 cooperating with a rubber anchoring compound 9. That rubber anchoring compound 9 is arranged on both sides of the sections 40 of the first cords 4 between those sections and the circumferential windings 41, 42 of the second cords 7. That rubber anchoring compound 9 is in direct contact with at least one portion of the circumference of the first cord 4 and the second cord 7 present in the anchoring zone 20. In the example presented, the rubber anchoring compound 9 is in contact with all the sections 40 of the first cords 4 placed in the anchoring zone 20 axially on both sides of the latter and fills the interstices between the adjacent first cords. That direct contact between the rubber anchoring compound 9 and the first cords 4 and the second cords 7 in the anchoring zone 20 is essential for there to be good mechanical cooperation between the second cords 7 and the rubber anchoring compound 9 in order to solidly anchor the sections 40 of the first cords 4 in the anchoring zone 20 of the bead 2 and to take up the stresses sustained by the first cords 4 due, notably, to the inflation pressure of the tire. The second cords 7 are appreciably inextensible and can be wire cords. The first cords can usually be textile reinforcements of high modulus of elasticity, such as aramid reinforcements.

A standard rubber compound 10 called "inner rubber" is found axially inward from the circumferential winding of the second cords 41. Axially outward from the circumferential winding of the second cords 42, one finds a filler compound 11 and a protecting compound 12 and then, radially outward, a sidewall compound 13 progressively replaces them. Radially outward from the anchoring zone 20, the first cords 4 of the carcass reinforcement 3 are in direct contact with a compound 14.

The first cords 4 and the second cords 7 of the tire bead are in contact with two different rubber compounds, the rubber anchoring compound 9 in the anchoring zone 20 and the radially outward compound 14. The principal mechanical characteristic of the rubber-anchoring compound is its excellent creep strength associated with a modulus of elasticity ranging between 10 and 20 MPa. Compound 14 usually has a weaker rigidity, with a modulus ranging between 3 and 10 MPa.

Another embodiment of a tire bead according to the invention is presented in FIG. 2. That tire is intended to equip heavy trucks. The carcass reinforcement 3 is formed by two circumferential alignments 4 and 5 of first cords corresponding in that figure to the two sections of cords 40 and 50. In the case of the tire according to the invention described here, the two sections of cords 40 and 50 are radially oriented in the sidewall 1 and consist of aramid fibers. The sections of first cords 40 and 50 are arranged parallel and are separated by a rubber compound 6. In the anchoring zone 20 of the bead 2 of that tire, the two circumferential alignments 4, 5 of first cords are anchored by the circumferential windings 41, 42, 51, 52 and 61 of second cords 7 arranged axially on both sides of the sections of first cords 40 and 50 and connected to the portions of the first cords by a rubber anchoring compound 9. The windings or piles of circumferential second cords can advantageously be spiral windings of reinforcements. In that example, those circumferential second cords are spiral-wound wire cords. The rubber anchoring compound 9 is in direct contact with the circumferential cords and the radial cords. That rubber compound avoids all contact of one cord with another. This structure makes it possible to take up the tension developed in the portions of cords 40, 50 on inflation of the tire.

Rubber compound 6 consists, in the example presented, of three rubber compounds of varied rigidities. A first compound 62 is situated in the anchoring zone 20 of the carcass reinforcement 3 between the two circumferential alignments of first cords up to limit A. That first compound corresponds to the previous rubber anchoring compound 9 and to a modulus of elasticity ranging between 10 and 20 MPa. A second rubber compound 63 is placed in the crown zone and in a part of the sidewalls 2 adjacent to the crown, that is, to the shoulder and in the whole part radially above a limit B situated roughly at the equator E. The "line" corresponding to the greatest axial width of the tire is called "equator." That second compound has a low modulus of elasticity in the order of 2 to 5 MPa. Finally, a third compound 64 is placed in an intermediate zone between the two preceding limits A and B. That third compound has an intermediate modulus of elasticity ranging between 6 and 10 MPa. Both compounds 63 and 64 can also be identical.

In the anchoring zone of the tire bead of FIG. 2, the rubber anchoring compound is the only rubber compound in contact with the first and second cords (except perhaps for the radially lower ends of the sections 40 and 50 of the first cords). That compound gives this structure excellent mechanical resistance to the stresses undergone on inflation of the tire and on running.

FIG. 3 is a view in perspective indicating the relative arrangements of the first and second cords in one of the embodiments of the tire beads of the invention. The cords are alone represented in FIG. 3. The circumferential alignment 5 of the first cords can be seen, consisting of sections of cord 50. At their radially lower ends, the wire portions 50 form juxtaposed loops 55, situated in the bead 2. These loops 55 are adjacent and do not overlap. Axially on both sides of the circumferential alignment 5 of first cords, only the piles 61 and 51 axially directly adjacent to that alignment are represented.

For the sake of clarity of the drawing, only the circumferential alignment 5 of the first cords have been represented, but the circumferential alignment 4 of the first cords presents the same arrangement of the portions of cords 40.

Other embodiments for the realization of the circumferential alignment 5 of first cords can be used. As an example, instead of one cord forming adjacent forward and return paths with loops in the bead, one can use individual cords applied successively or also use strips of cords.

The rubber-anchoring compound according to the invention therefore has, as essential mechanical characteristics, a rigidity such that its modulus of extension at 10% deformation ranges between 10 and 20 MPa, an excellent creep strength at high temperature and very good stability at high temperature. The rigidity chosen gives the bead structures described sufficient flexibility to make possible easy mounting and demounting of tires, even those of large size, on their service rims without degrading fatigue performances; the creep strength is essential for obtaining solid and durable anchoring of the carcass reinforcements in the beads and thermal stability at high temperature is also important because of the very severe temperature conditions that some tire beads can undergo, notably in tires for all kinds of trucks.

The experiments showed that, in order to obtain good fatigue results, a rubber-anchoring compound can be used, containing an SBR synthetic elastomer of Tg ranging between −70 and −30° C., used alone or mixed with polybutadiene. The polybutadiene preferably has a Tg ranging between −110 and −90° C. The synthetic elastomer or elastomers are used in a totalized proportion of at least 50% of the total weight of elastomer, the balance consisting of natural rubber. The rubber anchoring compound further contains reinforcing fillers such as carbon black and a vulcanization system appropriate for obtaining the desired rigidity. The second cords are brass wire cords in the examples presented. It is therefore necessary for the rubber anchoring compound to have a high sulfur content and to contain additives promoting adhesion with brass (for example, cobalt or nickel metallic salts). One may use, for example, a sulfur content ranging between 5 and 8% of the total weight of elastomer and a carbon black content ranging between 60 and 70% of the total weight of elastomer. Preferably, carbon black N347 can be used.

Four compounds were made and tested to illustrate the characteristics of the rubber anchoring compounds according to the invention.

The principal characteristics of the formulation of those compounds can be found in the table below:

| Products | 1 | 2 | 3 | 4 |
|---|---|---|---|---|
| CN | 100 | 80 | 40 | 40 |
| SBR2300 | 0 | 10 | 30 | 60 |
| BR113 | 0 | 10 | 30 | 0 |
| N347 | 62 | 62 | 62 | 62 |
| Sulfur | 7 | 7 | 7 | 7 |

These four compounds were tested as follows:

rigidity: determination of modulus of elasticity at 10% extension and at room temperature;

creep: static creep test at 150° C. for 7 hours, as previously described; and thermal stability: rheometry test at 197° C. for 10 min., as previously described.

| Test | 1 | 2 | 3 | 4 |
|---|---|---|---|---|
| Modulus of elasticity Creep test | 10.6 | 11.8 | 11.6 | 13.0 |
|  | Rupture after 30 min | Rupture after 60 min | OK | OK |
| τ | — | — | $1.10^{-3}$/min | $0, 6.10^{-3}$/min |
| r | 35% | 26% | 1.5% | 7.7% |

The four compounds have a satisfactory rigidity.

Figure 4:
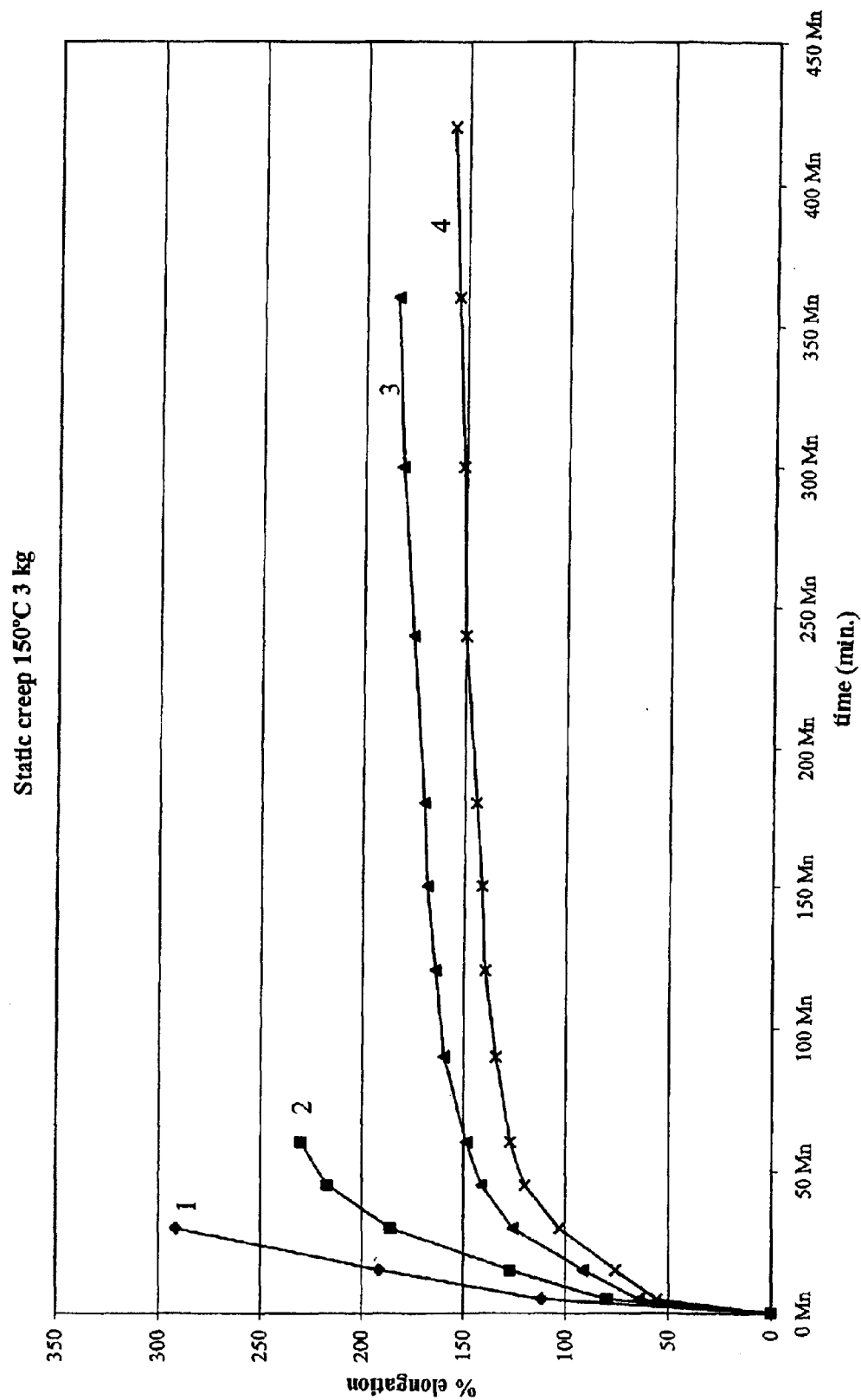
FIG. 4 presents results of static creep tests.

The results of the creep tests of the four compounds are shown in FIG. 4.

Compound 1, with a natural rubber base alone, presents a static creep strength at high temperature that is wholly inadequate. A rupture of the test pieces is observed after 30 min. of test. Its thermal stability is also unsatisfactory, since the compound presents a very marked reversion rate.

Compound 2 shows improved results over the first, but is not satisfactory either.

Compounds 3 and 4 successfully pass the static creep and rheometry tests. Their creep strength is entirely correct and so is their thermal stability at high temperature. Compound 3, which contains three elastomers, presents a slightly more satisfactory reversion result than compound 4.

Pneumatic tests were also performed with rubber anchoring compounds of formulations similar to the test compounds. The tires exhibited a correct capacity for mounting and demounting operations, but only those containing the rubber anchoring compounds corresponding to the formulations of compounds 3 and 4 showed a sufficient fatigue limit on anchoring of the carcass ply in the beads.

The embodiment of FIG. 1 concerns a tire for a passenger car and the embodiment of FIG. 2 a tire for a commercial vehicle. It will be obvious to one skilled in the art, however, that the invention can also be used for tires of other vehicles, such as two wheel vehicles.

The tires according to the invention can advantageously be built according to a process implying no or very few form modifications at the raw state. As an example, it is possible to assemble the various components on a rigid core fixing the shape of its inner cavity. All of the tire components are applied on that core, in the order required by the final architecture, being directly arranged in their final place, without undergoing shaping at any time of manufacture. That manufacture can, notably, employ the devices described in patent EP 0,243,851 for laying cords of the carcass reinforcement and in EP 0,264,600 for laying rubbery gum. The tire can then be molded and vulcanized, as explained in U.S. Pat. No. 4,895,692.

While the invention has been described in combination with embodiments thereof, it is evident that many alternatives, modifications, and variations will be apparent to those skilled in that art in light of the foregoing teachings. Accordingly, the invention is intended to embrace all such alternatives, modifications and variations as fall within the spirit and scope of the appended claims.

What is claimed is:

1. A tire containing a crown, two sidewalls and two beads, a carcass reinforcement with first reinforcing layers placed adjacent, aligned circumferentially in at least one circumferential alignment from at least one of said beads to one of said sidewalls and anchored in said one bead, and a crown reinforcement, said one bead containing an anchoring zone enabling the carcass reinforcement to be maintained and including at least one circumferentially oriented second reinforcing layer cooperating with an adjacent portion of the carcass reinforcement by means of a rubber anchoring compound in contact with the second reinforcing layer and the adjacent sections of the first reinforcing layers, wherein the rubber anchoring compounds:

comprises an SBR of Tg ranging between −70 and −25° C. with a proportion by weight exceeding 20% of the total weight of elastomers;

comprises a polybutadiene of Tg ranging between −110 and −90° with a proportion by weight or less than 40% of the total weight of elastomers; and has a total proportion of synthetic elastomer exceeding 50% of the total weight of elastomers.

2. The tire of claim 1, wherein the rubber anchoring compound has a modulus of elasticity at a 10% deformation ranging between 10 and 20 MPa.

3. The tire according to claim 1, which the total proportion of synthetic elastomer ranges between 55 and 65%.

4. The tire according to claim 1, wherein the rubber anchoring compound supports, without breaking, a static creep stress at 150° C. under a strain of 2.35 MPa for at least 5 hours.

5. The tire according to claim 4, in which the rubber anchoring compound has a static creep rate at 150° C. under a strain of 2.35 MPa less than $2.10^{-3}$/min between 3 and 5 hours of stress.

6. The tire according to claim 1, wherein the rubber anchoring compound has a reversion rate after 10 min. at 197° C. of less than 10%.

7. The tire according to claim 6, in which the rubber anchoring compound has a reversion rate after 10 min. at 197° C. of less than 5%.

8. The tire according to claim 1, in which the first reinforcing layers form adjacent forward and return paths with loops in the beads connecting a forward to a return path every time.

* * * * *